Jan. 17, 1967 K. R. MORRIS 3,298,645
PIPE SUPPORT
Filed May 7, 1962 3 Sheets-Sheet 1
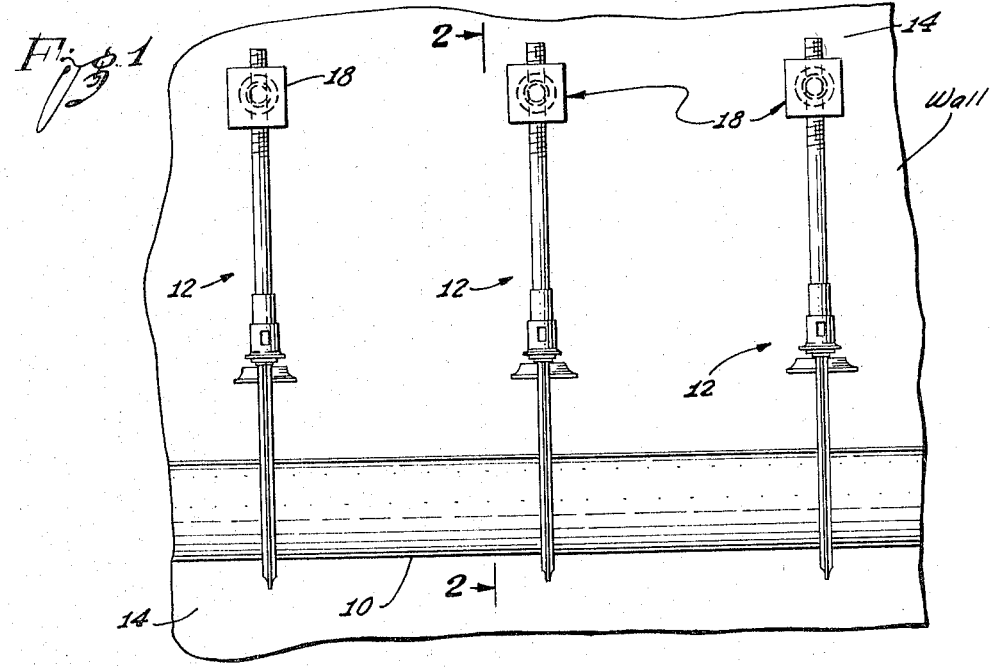
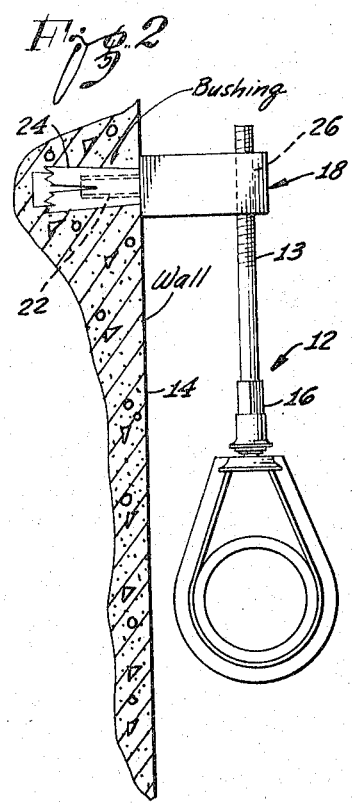
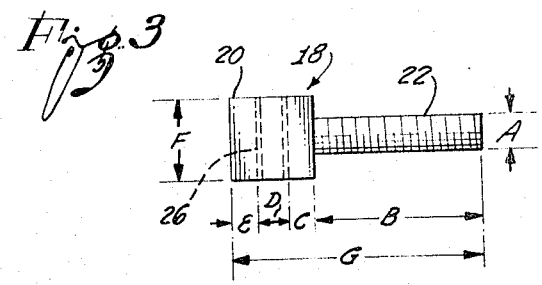
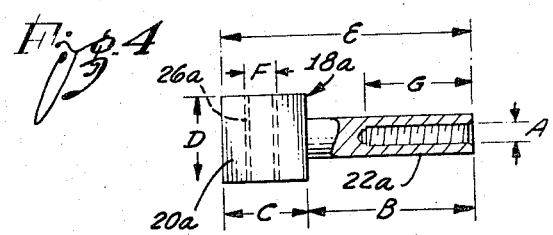
INVENTOR
Kenneth R. Morris
By Keith D. Becker
Attorney

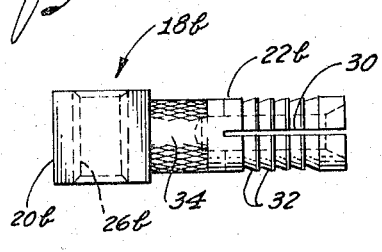
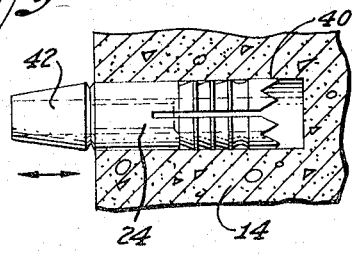
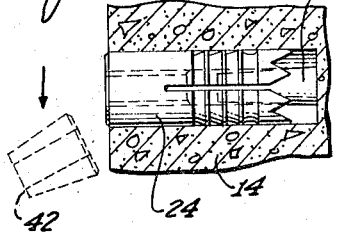
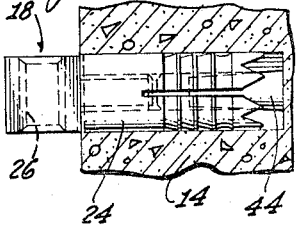
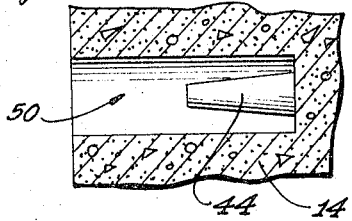
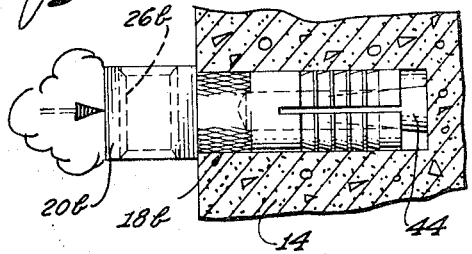

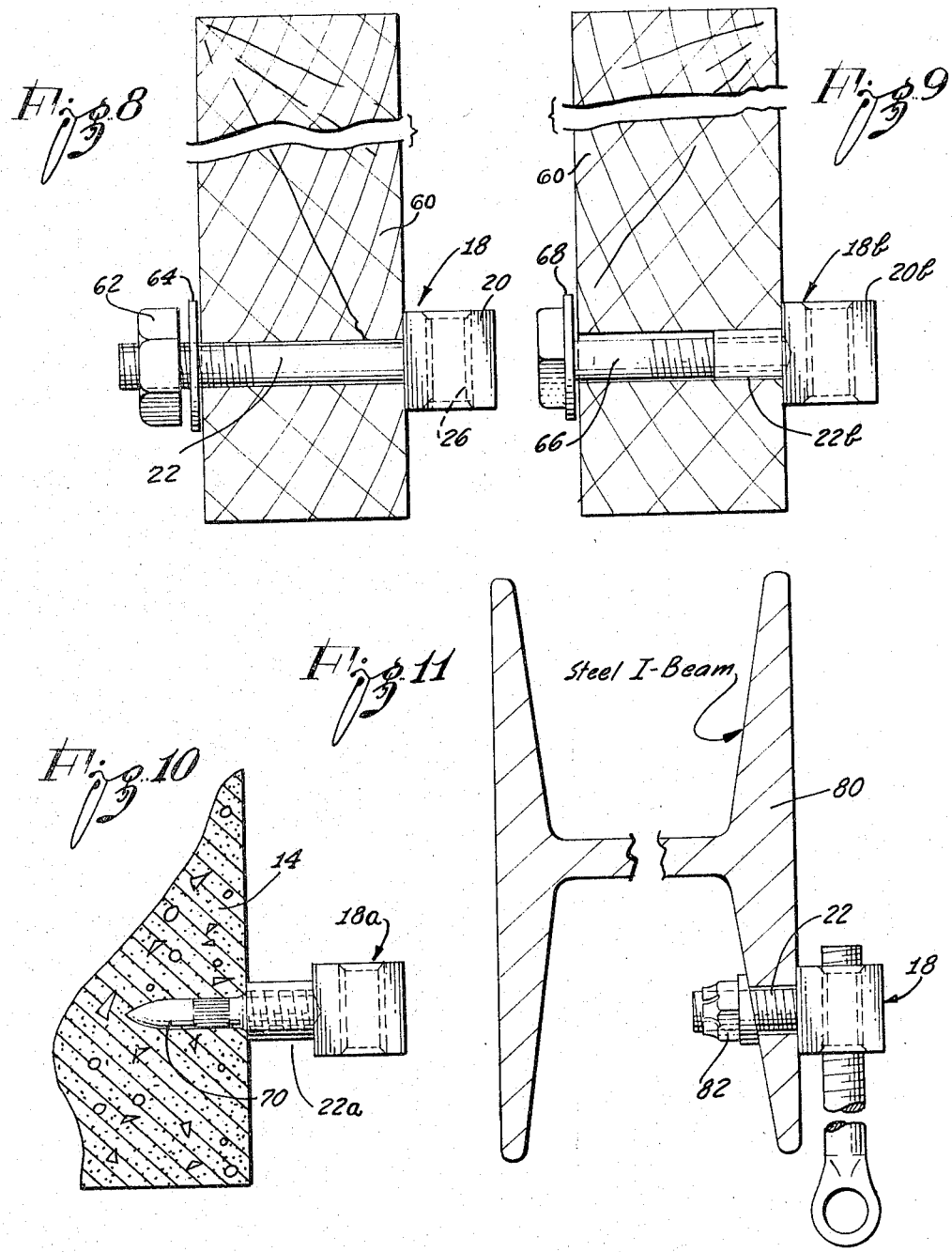

United States Patent Office 3,298,645
Patented Jan. 17, 1967

3,298,645
PIPE SUPPORT
Kenneth R. Morris, 10236 Old River School Road,
Downey, Calif. 90241
Filed May 7, 1962, Ser. No. 192,934
3 Claims. (Cl. 248—71)

The present invention relates to pipe supports, and it relates more particularly to a new and improved pipe support, and assembly, which provides a simplified means for suspending a pipeline from a wall, or other supporting structure having a vertical surface.

This application is a continuation-in-part of copending application Serial No. 58,430 filed September 26, 1960, now abandoned.

The pipe support of the present invention finds particular utility in automatic sprinkler systems. However, it will become evident as the description proceeds, that the pipe support of the invention is useful in a wide variety of applications in which a simple and convenient supporting means for a pipeline, or other similar instrumentality, is required.

Automatic sprinkler systems are made up of pipes carrying water at high pressure. Soft metal plugs are placed in the sprinkler heads along these pipes at intervals, for example, of about eight feet. The plugs melt, for example, at around 160° Fahrenheit, and as soon as a fire creates enough heat in a room to melt the plugs, the water from the sprinkler heads sprays the surrounding area.

As noted above, the improved pipe supports, and assembly, of the present invention are particularly suited for use to support the sprinkler system pipes from the walls, or from the joists, of the room in which the sprinkler system is installed.

It is usual in the prior art to provide a hanger type of support for the sprinkler pipes which is suspended from the ceiling. However, due to the presence of steel beams, or of other impediments, it is often inconvenient to mount the sprinkler pipes in this manner. The present invention is particularly concerned, as mentioned above, with the provision of an improved pipe support which permits the pipe to be suspended from a vertical surface, such as from the walls or joists of the room.

The prior art type of pipe support assembly usually includes a threaded rod with a ring-shaped hanger rotatably mounted at the bottom of the rod. The supported sprinkler system pipe passes through the ring-shaped hangers of a series of such support assemblies.

In order that the threaded rods of the prior art support assembly may be supported from the walls or joists of the room in which the sprinkler system is installed, it was usual in the prior art to mount a series of L-shaped angle irons at spaced positions along the walls or joists. This mounting of the angle irons required, in each instance, a separate bolt which extended through the vertical side of the angle iron to be threaded into appropriate bushings in the adjacent wall or joist. The upper end of the threaded rod was then inserted through a hole in the side of the particular angle iron, and a nut was provided to be threaded onto the rod to hold it in place.

The improved pipe support of the present invention is a distinct improvement over the prior art arrangement described immediately above, in that, inter alia, the pipe support of the invention serves to eliminate the need for the prior art angle irons, bolts and nuts required in the above-mentioned prior art assembly.

The pipe support of the present invention, as will be described, includes a unitary integral member. This member comprises, for example, a threaded body portion which is adapted to extend into an anchor shell or bushing in the wall or joist; or it may have other forms, as will be described.

The pipe support of the invention, in the embodiments to be described, also includes a head portion which is integral with the body portion at one end of the body portion. The head portion has a hole extending through it along an axis perpendicular to the longitudinal axis of the body portion. This latter hole is tapped to permit the upper end of the threaded rod to be threaded directly into it.

The improved pipe support of the present invention is advantageous in that, inter alia, it replaces the multiple elements required in most prior art arrangements. The improved pipe support of the invention is also advantageous in that it is relatively simple and inexpensive to construct; and in that it simplifies materially the required installation procedures, and reduces installation costs, when the pipe support of the invention is used in automatic sprinkler systems, or for other purposes.

Other advantages, features and objectives of the invention will become apparent from a consideration of the accompanying drawings, in which:

FIGURE 1 shows a section of pipe, such as a sprinkler system pipe, supported by appropriate brackets embodying the concepts of the present invention;

FIGURE 2 is an end view of the system of FIGURE 1, taken substantially on the line 2—2 of FIGURE 1, and showing particularly how a supporting member constructed in accordance with the invention may be mounted on a wall or other vertical supporting surface;

FIGURE 3 is a side elevational view of a pipe support constructed in accordance with one embodiment of the invention and having a body portion in the form of a threaded stud for engaging an anchor sleeve or bushing in the supporting surface;

FIGURE 4 shows a pipe support constructed in accordance with a second embodiment of the invention and including an internally threaded tubular body portion for engaging a bolt or similar threaded member extending out from the supporting surface, or through the supporting surface;

FIGURE 5 is a side elevational view of another embodiment of the invention in which the pipe support includes a body portion in the form of an anchor sleeve to be embedded in concrete;

FIGURES 6A, 6B and 6C are schematic representations showing the manner in which an anchor sleeve may be inserted in a concrete supporting structure to receive and mount the pipe support illustrated in FIGURE 3;

FIGURES 7A and 7B are schematic representations showing the manner in which a concrete supporting structure may be drilled to receive the embodiment illustrated in FIGURE 5;

FIGURE 8 illustrates a pipe support constructed in accordance with the invention and similar to the embodiment of FIGURE 3; the pipe support being illustrated as mounted on a joist;

FIGURE 9 illustrates a pipe support constructed similar to the pipe support of FIGURE 4 and supported by an appropriate bolt on a joist;

FIGURE 10 also shows a pipe support constructed similar to the embodiment of FIGURE 3 and supported on an anchor screw protruding from a concrete supporting structure; and FIGURE 11 shows a pipe support similar to the embodiment of FIGURE 3 supported on a steel I-beam, or the like.

In the assembly of FIGURE 1, a pipe 10 is supported by a plurality of pipe supporting assemblies, such as the assembly 12. These assemblies are mounted on a vertical supporting wall 14 at spaced positions along the wall. The assemblies 12 may all be similar in their construction, and only one will be described in detail, these being constructed to incorporate the concepts of one embodiment of the invention.

As also shown in FIGURE 2, the assembly 12 includes a threaded rod 13. A ring-type pipe-supporting bracket 15 is rotatably mounted at the lower end of the threaded rod 13 by an appropriate coupling 16. As shown in FIGURES 1 and 2, the pipe 10 passes through the ring-type pipe-supporting brackets.

In accordance with the prior art practices, it was usual to provide an angle iron for supporting the threaded rod 13 from a vertical supporting surface. The upper end of the rod 13 was inserted through the horizontal portion of the angle iron in the prior art assembly, and a nut was threaded on the upper end of the rod 13. A bolt was inserted through a hole in the vertical portion of the prior art angle iron and threaded into a bushing in the supporting surface.

In accordance with the concepts of the present invention, however, a single unitary pipe support 18 is provided. This pipe support, as will be described in more detail subsequently, is provided with a head portion 20 and with a body portion 22. In the embodiment of FIGURES 1 and 2, the body portion 22 of the pipe support is threaded into an appropriate anchor shell or bushing 24 which, in turn, is anchored into a concrete supporting wall 14. The head portion 20 has a threaded aperture 26 extending through it along a vertical axis, and the threaded rod 13 is threaded into the aperture 26 so that the rod may extend down from the pipe support 18 and so that it may be supported by the pipe support.

Therefore, in the practice of the embodiment of the invention illustrated in FIGURES 1 and 2, a plurality of pipe supports 18 are screwed into corresponding anchor shells 24 which, in turn, are anchored in the concrete wall 14, or in any other appropriate supporting structure. Then, it is merely necessary to thread the rods 13 into corresponding apertures 26 in the respective pipe supports 18 to complete all the necessary operations for supporting the pipe 10.

The pipe support 18, as illustarted in FIGURE 3, has the configuration described above in conjunction with FIGURES 1 and 2. As best illustrated in FIGURE 3, the body portion 22 is in the form of an externally threaded stud, and the head portion 20 is formed integral with the body portion 22 at one end thereof and has, for example, a square cross-section. The aperture 26 formed in the head portion 20 extends along an axis perpendicular to and transversely of the longitudinal axis of the body portion 22. The aperture 26 is tapped, so that the rod 13 may be directly threaded into it, as mentioned above.

The pipe support 18 may be composed, for example, of mild steel. Its threaded body portion 22 is adapted to be threaded into an appropriate bushing or anchor shell which was previously mounted in the supporting wall or joist, as mentioned above and as will be described in more detail subsequently.

The pipe support 18 of FIGURE 3 may, for example, be made in five different sizes, and these will be set out subsequently in an appropriate table. However, it should be stressed that the invention is not limited to any particular size or configuration of the pipe support.

In FIGURE 3, for example, the letter F indicates the dimension of one side of the square cross-section of the head 20; the letter A indicates the diameter of the body portion; the letter B indicates the length of the body portion; the letter C indicates the distance between the end of the head portion and the outside edge of the aperture 26; the letter D indicates the diameter of the aperture 26; the letter E indicates the distance between the end of the head 20 and the outer edge of the aperture 26; and the letter G indicates the over-all length of the pipe support.

TABLE I

| A | B | C | D | E | F | G |
|---|---|---|---|---|---|---|
| In. | In. | In. | In. | In. | In. | In. |
| 3/8 | 1/2 | 3/16 | 3/8 | 3/16 | 5/8 | 1 1/4 |
| 3/8 | 3/4 | 3/16 | 1/2 | 1/4 | 3/4 | 1 9/16 |
| 1/2 | 3/4 | 3/16 | 5/8 | 9/16 | 1 | 1 7/8 |
| 5/8 | 7/8 | 3/16 | 3/4 | 5/16 | 1 1/8 | 2 3/16 |
| 3/4 | 1 | 3/16 | 7/8 | 3/8 | 1 1/4 | 2 7/16 |

The pipe support of FIGURE 4 is generally similar to that shown in FIGURE 3 and is designated 18a. The difference between the embodiments of FIGURES 3 and 4 is that the body portion 22a of the embodiment of FIGURE 4 has a tubular configuration with internal threads.

As before, the supporting member 18a of FIGURE 4 is conveniently made from square mild steel stock which, in the case of this latter embodiment is turned down, drilled and tapped at one end to form the body portion 22a; and which is drilled and tapped along an axis transverse to the longitudinal axis of the body portion 22a to form a threaded aperture 26a in the head portion 20a.

The latter embodiment also may be made in different sizes, similar to those set forth in Table I above. Typical dimensions for the embodiment of FIGURE 4, with reference to the illustrated letters in FIGURE 4, are as follows:

TABLE II

| A | B | C | D | E | F | G |
|---|---|---|---|---|---|---|
| In. | In. | In. | In. | In. | In. | In. |
| 1/2 | 1 | 1 1/8 | 1 1/8 | 2 1/8 | 3/4 | 7/8 |

The pipe support of the present invention, as illustrated in the embodiment of FIGURE 5 is designated 18b. The pipe support 18b includes a head portion 20b which may have a configuration similar to the head portions 20 and 20a of the embodiments discussed above. Also, like the previous embodiments, a threaded aperture 26b is formed in the head portion 20b.

The body portion 22b of the embodiment of FIGURE 5 is formed integral with the head portion and has the form of a concrete anchor sleeve. This sleeve, for example, has a tubular configuration, and has a plurality of slots, such as the slot 30 extending longitudinally from its forward end.

The forward end of the sleeve-like body portion 22b of the embodiment of FIGURE 5 is also formed with annular tooth-shaped grooves 32 which serve to retain the sleeve-like body portion in the supporting structure. The body portion also has a knurled surface 34 which also serves as a retaining means to hold the body portion firmly in the supporting structure.

The schematic representations of FIGURES 6A, 6B and 6C, as mentioned above, illustrates the manner in which the anchor shell 24 illustrated in FIGURE 2 may be mounted in the supporting wall 14, it being assumed that the supporting wall is formed of concrete.

In accordance with known techniques, the anchor shell 24 is a self-drilling type, and is provided with a toothed inner edge 40 and with a drill-receiving head 42 (FIGURE 6A). An appropriate drilling tool engages the head 42 and causes the anchor shell 24 to rotate so that it may be drilled into the concrete supporting structure 14 in the position shown in FIGURE 6A.

The anchor shell 24 is then removed from the concrete supporting structure, and a conical-shaped anchor member 44 is inserted into the resulting hole. The shell 24 is then driven into the hole to the position shown in FIGURE 6B, the anchor member 44 serving to spread the end of the shell 24 firmly to anchor the shell in the concrete supporting structure 14.

The drill receiving head 42 is removed, and the anchored shell 24 in FIGURE 26A is in position to receive the threaded body portion 22 of the pipe support 18. The body portion of the pipe support 18, as shown in FIGURE 6C, is threaded into the end of the shell 24 to be supported against the vertical surface of the concrete supporting structure 14 with the aperture 26 being disposed on a vertical axis.

In the mounting of the embodiment of FIGURE 5 in a concrete supporting structure 14, and as shown in FIGURES 7A and 7B, a suitable hole 50 is first drilled in the concrete supporting structure, and the anchor 44 is inserted down at the end of the hole. Then, the pipe support 18b is driven into the hole to the position shown in FIGURE 7B. As shown in FIGURE 7B, the head portion 20b of the pipe support 18b is supported with the threaded aperture 26b extending along a vertical axis.

The pipe support 18 of FIGURE 3 may have an elongated body portion 22, as shown in FIGURE 8, so that the pipe support may be mounted on a joist 60.

In the mounting of FIGURE 8, the body portion 22 extends through the joist 60 from one of its spaced vertical surfaces to the other, and the pipe support is held in place by a nut 62 which is threaded onto the end of the body portion to bear against a washer 64, the washer being interposed between the nut and one of the vertical surfaces of the joist 60. The head portion 20 is supported in a manner such that its threaded aperture 26 extends along a vertical axis to receive the threaded rod 13.

In the embodiment of FIGURE 9, the pipe support 18b has the configuration described above in conjunction with FIGURE 4. The body portion 22b of the pipe support extends into a hole which extends through the joist 60, such that the forward edge of the head portion 20b engages one of the vertical surfaces of the joist 60.

In the embodiment of FIGURE 9, a bolt 66 is provided, and this bolt extends into the hole through the joist 60 from the opposite vertical surface of the joist. The bolt threadably engages the internal threads of the body member 22b to hold the pipe support 18b securely in space. A washer 68 may be interposed between the head of the bolt 66 and the vertical surface of the joist 60.

The pipe support may also be supported on the vertical surface of a concrete supporting structure 14 by means of an anchor screw 70, as shown in FIGURE 10. The anchor screw 70 is embedded in the supporting structure 14, and it includes a threaded portion which protrudes out from the vertical surface of the supporting structure. The tubular body portion 22a of the pipe support 18a threadably receives the protruding threaded portion of the anchor screw 70, so that the pipe support 18a is firmly supported on the surface of the supporting structure.

The pipe support 18 of the present invention may also be conveniently supported on an I-beam, for example, such as shown in FIGURE 11. In the latter embodiment, an I-beam 80 has a pipe support 18, similar to the embodiment of FIGURE 3 mounted on it. The body portion 22 of the pipe support 18 extends through an aperture in one web of the I-beam 80, and the nut 82 is threaded onto the end of the body portion 22 to hold the pipe support 18 firmly in place.

The present invention provides, therefore, an improved, unique and simplified pipe support which provides a simple, inexpensive and expedient means for supporting pipelines for use, for example, in a sprinkler system. The pipe support, and assembly, of the present invention are primarily intended for supporting the pipeline from a vertical surface. However, it will be appreciated, that the pipe support may be mounted into a horizontal surface, if so desired.

The improved pipe support of the present invention is advantageous because of its unitary and threaded construction. The simple yet sturdy and rugged pipe support of the invention may quickly be mounted in the supporting structure, in accordance with the procedures outlined above, so that a strong and rigid support for the pipeline may be installed with a minimum of effort and in a minimum of time.

While particular embodiments of the invention have been described, modifications may be made. It is intended in the claims to cover all such modifications as fall within the spirit of the invention.

What is claimed is:

1. A pipe supporting assembly including: a support member having an elongated body portion in the form of a tubular-shaped anchor shell adapted to be supported in a concrete supporting structure on a horizontal axis, and a head portion formed integral with said body portion at one end thereof and having a threaded aperture therein extending transversely to the axis of said body portion to be vertically disposed; a threaded rod extending into said aperture in said head portion in threaded engagement therewith to extend vertically down from said head portion; and a ring-shaped pipe-supporting bracket pivotally mounted at the lower end of said threaded rod.

2. A pipe supporting assembly including: a concrete supporting structure having a vertical surface; a supporting member having an elongated body portion in the form of a tubular-shaped anchor shell extending into said supporting structure on a horizontal axis and anchored therein, and a head portion formed integral with said body portion at one end thereof disposed externally of said supporting structure adjacent said vertical surface thereof, said head portion having a threaded aperture therein extending transversely to said horizontal axis to be vertically disposed; a threaded rod extending into said aperture in said head portion in threaded engagement therewith to extend vertically down from said head portion; and a ring-shaped pipe-supporting bracket pivotally mounted at the lower end of said threaded rod.

3. A pipe supporting assembly including: a concrete supporting structure having a vertical surface; a stud-like anchor member embedded in said supporting structure on a horizontal axis and having a threaded portion protruding through said vertical surface; a support member having an elongated internally threaded body portion threadably engaged with said protruding threaded portion of said anchor member, and a head portion formed integral with said body portion at the outer end thereof, said head portion having a threaded aperture therein extending transversely to said horizontal axis to be vertically disposed; a threaded rod extending into said aperture in said head portion in threaded engagement therewith to extend vertically down from said body portion; and a ring-shaped pipe-supporting bracket pivotally mounted at the lower end of said threaded rod.

References Cited by the Examiner

UNITED STATES PATENTS

| | | | |
|---|---|---|---|
| 1,077,727 | 11/1913 | Loepsinger | 248—70 |
| 1,333,880 | 3/1920 | Stine | 50—471 X |
| 1,996,121 | 4/1935 | Phillips | 72—105 |
| 1,998,116 | 4/1935 | Bone | 85—9 |
| 2,914,983 | 12/1959 | Kopf et al. | 85—2.4 |
| 2,942,819 | 6/1960 | Brogan | 248—71 |
| 2,947,022 | 8/1960 | Chuck | 85—9 |
| 2,963,935 | 12/1960 | Shields | 85—2.4 |

CLAUDE A. LE ROY, *Primary Examiner.*

N. F. MARTIN, *Assistant Examiner.*